Figure 1:
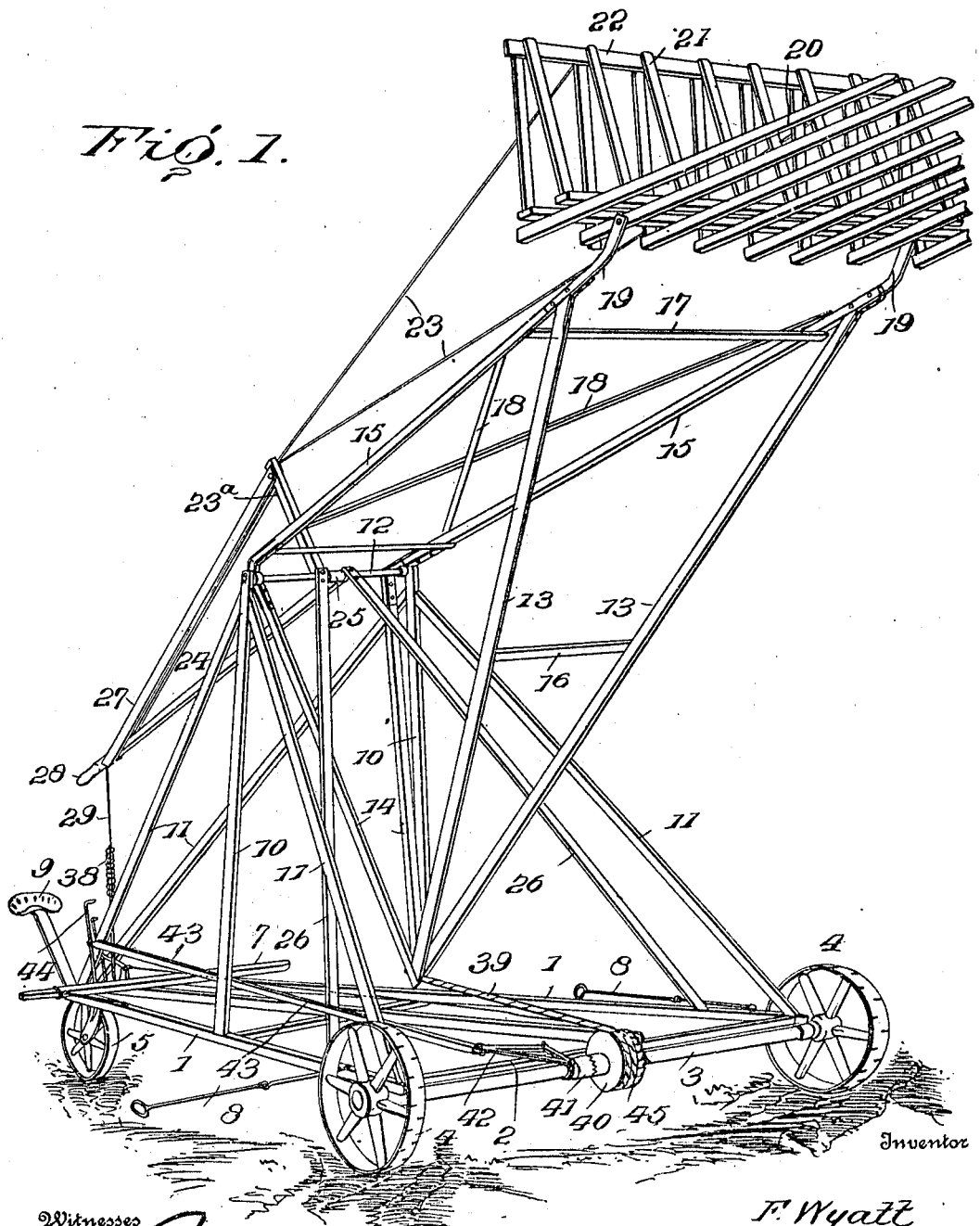

F. WYATT.
STACKER.
APPLICATION FILED DEC. 28, 1908. RENEWED OCT. 5, 1909.

956,840.

Patented May 3, 1910.
3 SHEETS—SHEET 1.

Witnesses

Inventor
F. Wyatt
By
Attorneys

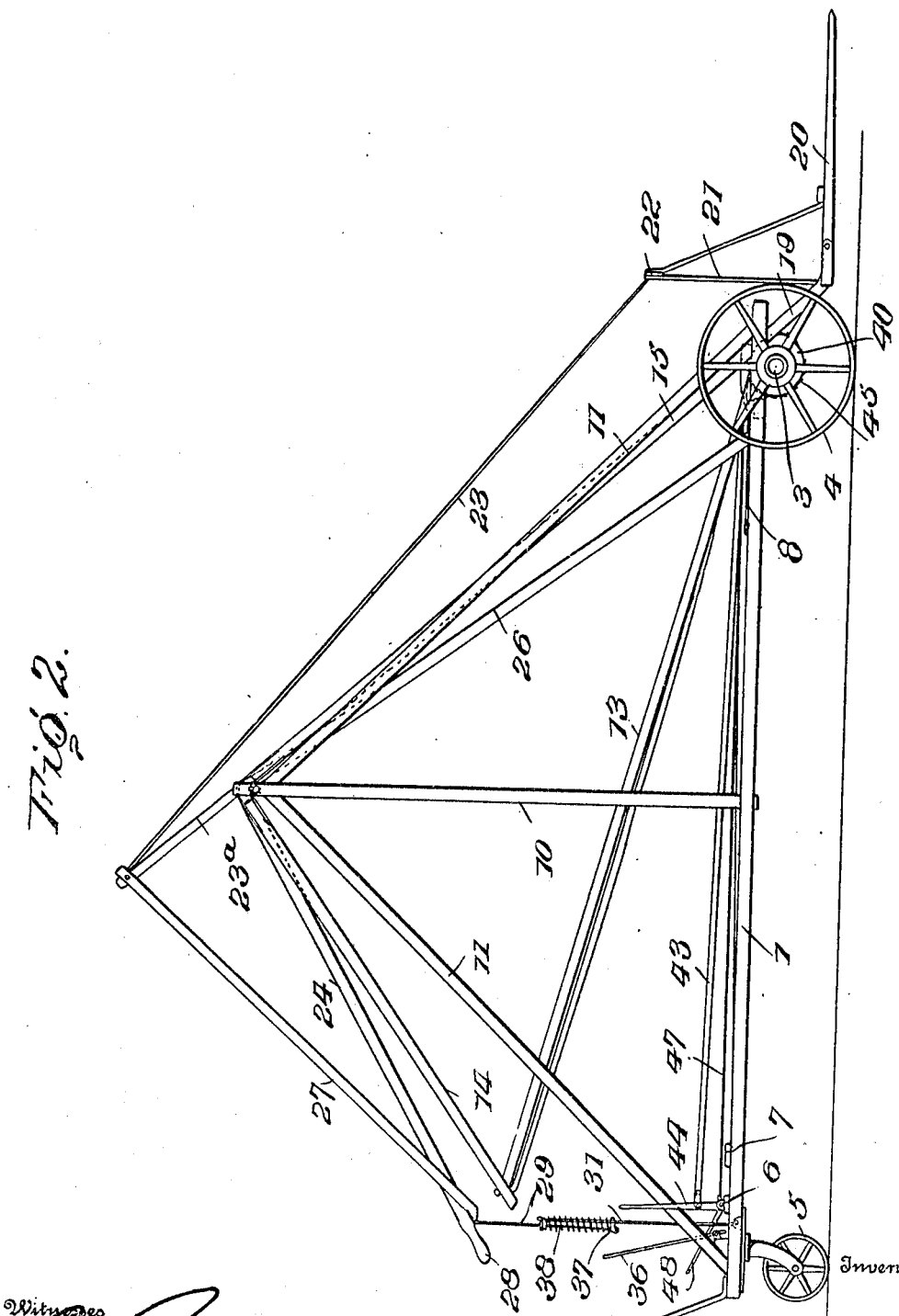

F. WYATT.
STACKER.
APPLICATION FILED DEC. 28, 1908. RENEWED OCT. 5, 1909.
956,840.
Patented May 3, 1910.
3 SHEETS—SHEET 3.
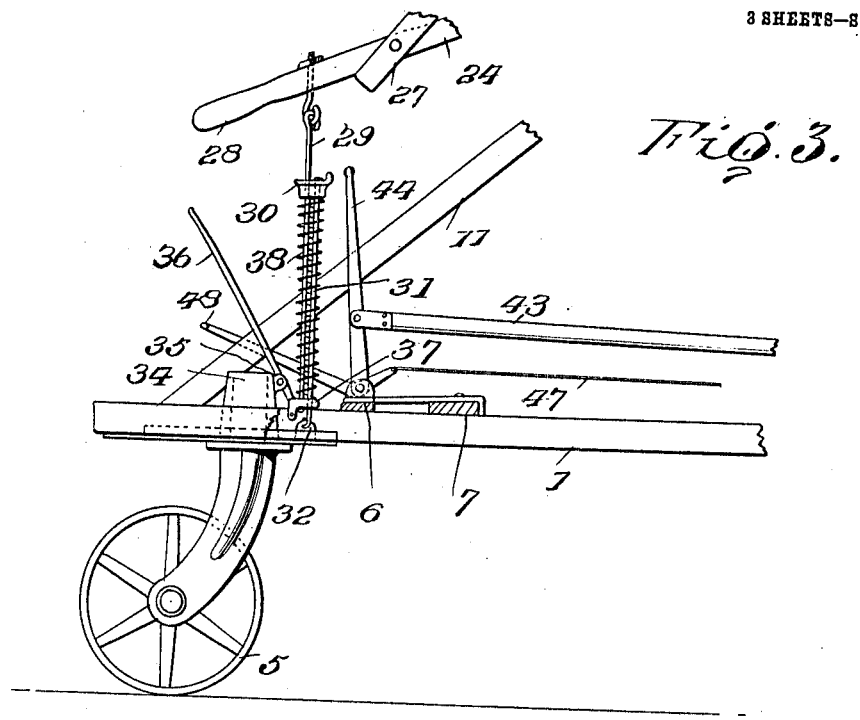
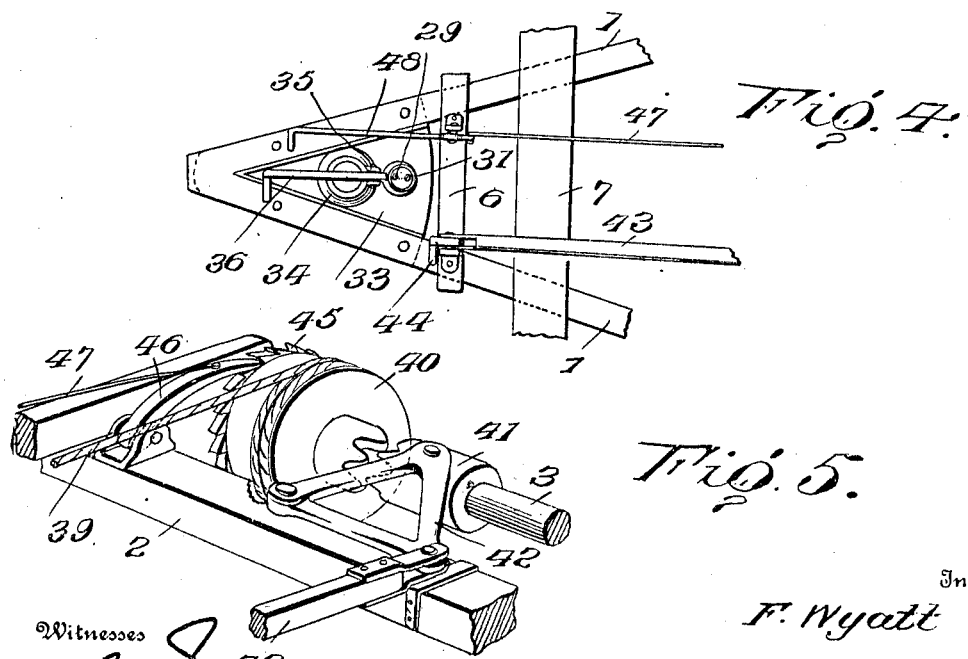
Inventor
F. Wyatt

UNITED STATES PATENT OFFICE.

FRANK WYATT, OF SALINA, KANSAS, ASSIGNOR TO THE F. WYATT MANUFACTURING COMPANY, OF SALINA, KANSAS.

STACKER.

956,840.  Specification of Letters Patent.  Patented May 3, 1910.

Application filed December 28, 1908, Serial No. 469,588. Renewed October 5, 1909. Serial No. 521,163.

*To all whom it may concern:*

Be it known that I, FRANK WYATT, a citizen of the United States, residing at Salina, in the county of Saline and State of Kansas, have invented certain new and useful Improvements in Stackers, of which the following is a specification.

This invention relates to machines for stacking hay, straw or the like in the field when reaping the harvest, the machine being designed to engage the bundles or shocks to deposit them upon the stack in the formation of the same.

The invention has for its object a simple, light, durable and efficient construction of hay stacker of this character which is arranged to be drawn over the field with its rake in lowered position, and to be under the control of one operator riding upon the framework of the machine, the load being raised to the desired elevation by horse-power, and the rake being tripped or dumped when raised to the desired height to deposit the shocks or bundles upon the stack.

With this and other objects in view that will more fully appear as the description proceeds, the invention consists in certain constructions and arrangements of the parts that I shall hereinafter fully describe and claim.

For a full understanding of the invention and the merits thereof and to acquire a knowledge of the details of construction, reference is to be had to the following description and accompanying drawings, in which:

Figure 1 is a perspective view of a hay stacker constructed in accordance with my invention; Fig. 2 is a side elevation thereof, the rake being shown in lowered position; Fig. 3 is a side elevation of the rear end of the stacker, the driver's seat and its support being omitted; Fig. 4 is a top plan view of the rear end of the machine; Fig. 5 is a perspective view of a portion of the actuating mechanism.

Corresponding and like parts are referred to in the following description and indicated in all the views of the drawings by the same reference characters.

The frame work of my improved hay stacker embodies side beams 1 which converge rearwardly, as shown, a front cross beam 2, a front axle 3 which is mounted to turn with the front round traveling wheels 4, and a rear caster wheel 5. Preferably, the framework embodies a rear cross bar 6 secured to the side beams 1 near the rear ends thereof.

7 designates the doubletree to which the team may be secured in any desired way, 8 the breast chains or links for the team, and 9 the driver's seat.

Standards 10 project upwardly from the side beams 1 near the middle thereof, said standards being braced fore and aft by means of the diagonal bars 11, and a transversely extending shaft 12 is supported in the upper ends of said standards. The shaft 12 constitutes an axis or fulcrum for the rake-supporting beam or crane which, in the present instance, is constructed of two similar triangular frames, each of which embodies a main bar 13 and angularly disposed bars 14 and 15 secured at their ends to the bars 13 and joined together by suitable metallic straps so as to pivot them on the shaft 12. The two triangle-shaped brace frames thus formed converge toward one end, as clearly illustrated in the drawings, and they are braced by cross bars 16 and 17 and intersecting diagonal braces 18, as shown. The crane or rake support thus formed is provided at the junction of the bars 13 and 15 with forwardly extending metallic straps 19 to which the rake is pivotally connected, the said rake embodying a series of tines 20 and a head portion 21, the latter including a cross bar 22, as shown. Rearwardly converging cables 23 are connected to the cross bar 22 and are also connected at their rear ends to the arm 23ª of a bell crank lever, 24 designating the other arm of said lever. This lever is fulcrumed at its elbow, as indicated at 25, on the shaft 12 between the upper ends of two braces 26, said braces being secured at their upper ends to the shaft 12 and at their lower ends being supported on the beams 1 near the front ends of the latter. The arms 23ª and 24 of this bell crank lever are connected together near their outer ends by braces 27, and the rear end of the arm 24 is formed into a handle portion, as indicated at 28.

A link rod 29 is secured by a hooked bolt or the like, to the rear end of the arm 24 of this bell crank, and said link rod extends downwardly through a sleeve 30 which is secured to the upper end of a corresponding link rod 31. The lower end of this link rod 31 is pivotally secured between ears 32 that are formed on a portion of the plate 33 which serves to secure together the rear ends of the side beams 1 of the supporting framework. The bearing 34 for the shaft or standard of the caster wheel 5, is formed with ears 35, and a trip lever 36 is mounted between said ears, the lower end of said lever being designed for engagement with a latch plate 37 secured to the lower end of the link rod 29.

38 designates a spring which is coiled around the rods 29 and 31 between the sleeve 30 and latch plate 37, the said spring having an expansive action and serving to yieldingly limit the extensible movement of the link rod 29 with respect to the other link rod 31. The upper end of the trip lever 36 is bent, as shown, to serve as a foot-engaging member.

A cable 39 is secured to the rake support or crane, at the junction of the two triangular frames, as clearly illustrated in the drawings, and said cable is wound around a drum 40 which is normally loose on the front axle 3, but which is designed to be engaged with said axle by means of a clutch member 41. The clutch member 41 is operated by means of a shipper lever 42, one arm of said lever being connected to the front end of an actuating rod 43. This rod extends rearwardly and is connected at its rear end to a lever 44 fulcrumed on the rear cross bar 6 of the framework. The drum 40 is also formed with a ratchet 45. A gravity pawl 46 is designed to engage the ratchet 45, and a rod or wire 47 is connected to said pawl and extends rearwardly, the rear end of said wire being connected to a foot-operated lever 48 fulcrumed on the cross bar 6.

In the practical operation of my improved hay stacker, the same is drawn along the fields by a team hitched to the breast links 8 and doubletree 7, with the rake in its lowered position. After the load has been received on the rake, the clutch 41 is thrown in, and as the machine is then advanced toward the stack, it is obvious that the drum 40 will rotate with the axle so as to wind up the cable 39 and elevate the rake, it being understood that up to this point in the operation, the rake has been held with its tines extending substantially in a horizontal position by means of the connection of the latch plate 37, link rod 39 and the trip lever 36. After the load has been raised to the desired elevation, the clutch 41 is thrown out, while the load is held at the desired height by means of the pawl 46 and its engagement with the ratchet 45 of the drum. The operator on the seat then trips the lever 36, and the link rod 39 is thereupon released so as to permit the fork to tilt and dump the load upon the stack, after which the operator actuates the lever 48 and releases the pawl 46 from the ratchet 45, and the rake support or crane is permitted to lower to receive another load.

Having thus described the invention, what I claim is:

1. In a stacker, a supporting framework, a shaft held thereon in an elevated position, a rake support mounted to rock on said shaft, a rake carried by said support and pivotally mounted thereon, a lever fulcrumed on said shaft and operatively connected to said rake, said lever embodying an arm extending rearwardly from the shaft, a link rod connected to and depending from said arm, another link rod having an extensible connection with the first named link rod and connected at its lower end to the framework, a latch plate connected to said first named link rod, a trip lever designed to engage said latch plate, and a support for said trip lever.

2. In a stacker, the combination of a supporting framework, a shaft mounted thereon in an elevated position, a rake support mounted to rock on said shaft, a rake having a pivoted connection with said rake support, an angular lever fulcrumed on said shaft, one arm of said lever being operatively connected to said rake, a link rod depending from the other arm of said lever, another link rod having an extensible connection with the first named link rod and secured to the supporting framework, a latch plate carried by the first named link rod, a sleeve carried by the other link rod and engaging the first named link rod, a spring encircling said link rods between the latch plate and sleeve, a trip lever designed to engage said latch plate, and a support for said trip lever.

In testimony whereof I affix my signature in presence of two witnesses.

FRANK WYATT. [L. S.]

Witnesses:
R. H. CRAVENS,
R. P. CRAVENS.